United States Patent
Carlson et al.

(10) Patent No.: US 8,075,410 B2
(45) Date of Patent: Dec. 13, 2011

(54) TORSIONAL VIBRATION DAMPER ARRANGEMENT

(75) Inventors: Cora Carlson, Dittelbrunn (DE); Andreas Orlamünder, Schonungen (DE); Thomas Dögel, Bad Kissingen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 272 days.

(21) Appl. No.: 12/520,360

(22) PCT Filed: Dec. 4, 2007

(86) PCT No.: PCT/EP2007/010506
§ 371 (c)(1),
(2), (4) Date: Jun. 19, 2009

(87) PCT Pub. No.: WO2008/074397
PCT Pub. Date: Jun. 26, 2008

(65) Prior Publication Data
US 2010/0043593 A1 Feb. 25, 2010

(30) Foreign Application Priority Data
Dec. 19, 2006 (DE) .......................... 10 2006 059 880

(51) Int. Cl.
*F16D 3/80* (2006.01)
(52) U.S. Cl. ....................................... 464/24; 74/573.11
(58) Field of Classification Search .................... 464/24, 464/27; 74/572.2, 573.1, 573.11
See application file for complete search history.

(56) References Cited

U.S. PATENT DOCUMENTS

| 4,576,259 A * | 3/1986 | Bopp ............................... 464/24 |
| 4,739,866 A * | 4/1988 | Reik et al. ........................ 464/24 |
| 5,078,648 A * | 1/1992 | Stretch ............................ 464/27 |
| 5,273,372 A * | 12/1993 | Friedmann et al. ............. 464/24 |
| 6,050,380 A * | 4/2000 | Peinemann et al. ............ 464/24 |
| 6,305,519 B1 * | 10/2001 | Katoh et al. .................... 464/24 |
| 7,137,624 B2 * | 11/2006 | Russell et al. |
| 7,484,607 B2 * | 2/2009 | Schneider et al. |
| 2006/0247065 A1 | 11/2006 | Bach et al. |
| 2009/0133529 A1 * | 5/2009 | Kister et al. .................... 464/27 |
| 2010/0300820 A1 * | 12/2010 | Carlson et al. |

FOREIGN PATENT DOCUMENTS

| DE | 10 2005 018 954 | 11/2006 |
| DE | 10 2005 058 531 | 6/2007 |
| DE | 10 2006 059 880 | 6/2008 |
| EP | 0 009 981 | 4/1980 |
| EP | 0 303 239 | 2/1989 |
| JP | 61189325 | 8/1986 |
| JP | 200199231 | 4/2001 |

* cited by examiner

*Primary Examiner* — Gregory Binda
*Assistant Examiner* — Josh Skroupa
(74) *Attorney, Agent, or Firm* — Cozen O'Connor

(57) ABSTRACT

Disclosed is a torsional vibration damper arrangement, especially for the drive train of a vehicle, including a primary side and a secondary side which is coupled to the primary side by a damper fluid arrangement in order for the primary side and the secondary side to rotate about an axis of rotation and rotate relative to one another. The damper fluid arrangement encompasses a first damper fluid that has low compressibility and transmits torque between the primary side and the secondary side as well as a second damper fluid which is more compressible and is loaded when the pressure of the first fluid increases.; The torsional vibration damper arrangement is characterized in that a volume containing the second damper fluid is disposed outside the primary side and outside the secondary side and does not rotate about the axis of rotation along with the primary side and the secondary side.

22 Claims, 5 Drawing Sheets

TORSIONAL VIBRATION DAMPER ARRANGEMENT

PRIORITY CLAIM

This is a U.S. national stage of application No. PCT/EP2007/010506, filed on 4 Dec. 2007, which claims Priority to the German Application No.: 10 2006 059 880.6, filed: 19 Dec. 2006; the contents of both being incorporated herein by reference.

BACKGROUND OF THE INVENTION

1. Field of the Invention

The present invention relates to a torsional vibration damper arrangement, especially for the drive train of a motor vehicle, having a primary side and a secondary side, the secondary side being connected to the primary side for rotation around an axis of rotation and for relative rotation of the two sides with respect to each other by a damper fluid arrangement, where, to transmit torque between the primary side and the secondary side, the damper fluid arrangement includes a first damper fluid of a first compressibility and a second damper fluid of a second compressibility greater than the first compressibility, the second damper fluid being put under load when the pressure of the first fluid increases.

2. Prior Art

A torsional vibration damper arrangement for the drive train of a motor vehicle in which torque is transmitted between a primary side and a secondary side by way of a first damper fluid of low or negligible compressibility, such as an oil, and a second damper fluid of comparatively high compressibility, such as air, is disclosed in DE 10 2005 018 954 A1. The damper fluid arrangement comprises two fluid chambers connected in series between the primary side and the secondary side and separated by a separating piston, one of these chambers being filled with the essentially incompressible fluid, the other with the compressible fluid. So that the damping characteristic can be influenced, the fluid chamber in which the compressible fluid is present is connected by a rotary leadthrough to a source of this pressurized compressible fluid such as air or some other gas. The problems here are that chambers for both fluids must be provided, one in the area of the primary side, the other in the area of the secondary side, and that a rotary leadthrough and the necessary seals for a gaseous fluid must be provided.

The subsequently published German Patent Application 10 2005 058 531.0 discloses a torsional vibration damper in which the transmission of torque occurs by way of series-connected fluid chambers, one of which contains a comparatively highly compressible fluid such as air, whereas the other contains an essentially incompressible fluid such as oil. A supply system operating by way of a rotary leadthrough is assigned to the volume area, i.e., to the chamber, which is filled with the incompressible fluid to change the pressure of this essentially incompressible fluid.

SUMMARY OF THE INVENTION

One goal of the present invention is to provide a torsional vibration damper arrangement which, although of simple and compact design, makes it possible to vary the damping characteristic.

According to one embodiment of the invention, a torsional vibration damper arrangement for the drive train of a motor vehicle is disclosed, comprising a primary side and a secondary side, the secondary side being connected to the primary side for rotation around an axis of rotation and for relative rotation with respect to each other by a damper fluid arrangement. To transmit torque between the primary side and the secondary side, the damper fluid arrangement comprises a first damper fluid of lesser compressibility and a second damper fluid of greater compressibility, which is put under load when the pressure of the first fluid increases.

In one embodiment, a second damper fluid-containing volume is arranged outside the primary side and outside the secondary side and does not rotate around the axis of rotation with the primary side and the secondary side.

By removing the volume that contains the second damper fluid from the area of the rotating assemblies of the torsional vibration damper arrangement, various advantages are obtained and/or combined with each other. First, an influence on the pressure or on the quantity of the second damper fluid contained in the volume of the second damper fluid can be exercised without the need to provide a rotary leadthrough for this more highly compressible second damper fluid. This simplifies the design and avoids the danger of changes in the damping characteristic caused by fluid leakage. Removing the second damper fluid-containing volume from the rotating assemblies also creates additional space in this area, i.e., in the area of the primary side and secondary side, and in addition the possibility is created of designing the rotating assemblies, i.e., the primary side and the secondary side, more compactly.

A connection is established between the volume area which contains the first damper fluid and serves to transmit torque between the primary side and the secondary side and the volume of the second damper fluid, by a rotary leadthrough provided for the first damper fluid, where, by way of the rotary leadthrough, a working volume of the first damper fluid formed in the area of the primary side and of the secondary side is brought into connection with a compensating space for the first damper fluid, the volume of which can be changed by the compression/decompression of the second damper fluid.

The two fluids are kept reliably separated from each other by providing a pressure-equalizing cylinder arrangement, which provides the compensating space for the first damper fluid and a working space for the second damper fluid. The compensating space and the working space are separated from each other in an essentially fluid-tight manner by a variable separating arrangement. The variable separating arrangement comprises a separating piston or a separating membrane.

It is possible to exercise a significant influence on the damping characteristic of the inventive torsional vibration damper arrangement by varying the quantity of the second damper fluid present in the volume of the second damper fluid.

For this purpose, a supply device is assigned for increasing the quantity of the second damper fluid to the volume of the second damper fluid. The supply device comprises a compressor, preferably with a pressure reservoir.

To influence the quantity of the second damper fluid, a discharge device for reducing the quantity of the second damper fluid is assigned to the volume containing the second damper fluid. This discharge device comprises a first valve arrangement, and by means of this first valve arrangement, the volume of the second damper fluid is one of closed off when desired, brought into connection with the supply device for second damper fluid, and brought into connection with a discharge opening.

To influence the quantity or pressure of the first damper fluid, in one embodiment, a supply/discharge arrangement for first damper fluid is provided to change the pressure of the first damper fluid.

In one embodiment, the supply/discharge arrangement comprises a second valve arrangement, by means of which the working volume of the first damper fluid is sealed by way of the rotary leadthrough, brought into connection with a supply device for the first damper fluid, or brought into connection with an essentially pressureless reservoir for the first damper fluid.

The supply device for the first damper fluid comprises a pump, preferably with a pressure reservoir.

So that torque can be transmitted between the primary side and the secondary side by way of the first damper fluid while taking advantage of the damping effect of the more highly compressible second damper fluid, the working volume of the first damper fluid comprises at least one first working space for the first damper fluid, this space being bounded by the primary side and the secondary side, where the volume of the at least one first working space decreases upon relative rotation of the primary side versus the secondary side in a first direction of relative rotation and increases upon relative rotation in a second direction of relative rotation.

So that the pressures and volumes are equalized upon relative rotation and so that the effects of negative pressure, which counteract the damping, can be avoided, the working volume of the first damper fluid comprise a second working space assigned to each first working space, the volume of each second working space increases upon relative rotation in the first direction of relative rotation and decreases upon relative rotation in the second direction of relative rotation.

The at least one first working space is preferably connected to the compensating space by way of the rotary leadthrough.

To avoid the effects of negative pressure, the second working space is assigned to the at least one first working space be kept essentially pressureless by way of a pressure-relief opening arrangement. The second working space assigned to the at least one first working space preferably does not contain a first damper fluid.

In one embodiment, a third valve arrangement is provided, by means of which, in a first valve position, the at least one first working space is brought into connection with the compensating space, and the second working space assigned to the at least one first working space can be brought into connection with an essentially pressureless reservoir for the first damper fluid, and, in a second valve position, the at least one first working space can be brought into connection with the essentially pressureless reservoir for the first damper fluid and the second working space assigned to it can be brought into connection with the compensating space.

So that the working characteristic and thus also the damping characteristic are influenced as appropriate to various operating states by way of the third valve arrangement, a load direction-detecting arrangement is provided to detect the load direction of the primary side and of the secondary side, and that the third valve arrangement is placed into its first valve position or into its second valve position as a function of the load direction.

The design is such that, when the load direction-detecting device detects a load in a first load direction, the third valve arrangement is in its first valve position or is brought into this position, and, when a load in a second load direction is detected, the third valve arrangement is in its second valve position or is brought into this position, where, when the load is acting in the first load direction, a torque is transmitted from the primary side to the secondary side and, when the load is acting in the second load direction, a torque is transmitted from the secondary side to the primary side. It is thus possible to differentiate between a thrust state in which a torque is to be transmitted in a motor vehicle from a drive unit via the torsional vibration damper arrangement to the drive wheels and a thrust state in which the torque flow runs in the opposite direction and an engine-braking effect is to be exploited, for example. It is also possible to make use of the damping characteristic of the torsional vibration damper in both operating states.

The first damper fluid, i.e., the less compressible or essentially incompressible fluid, can be a liquid, and the second damper fluid, the compressibility of which makes an essential contribution to the production of the damping action, is preferably a gas. The flow resistances or throttling effects generated during relative rotation and thus the displacement of the first, less compressible or incompressible damper fluid also lead to a dissipation of energy and thus to a damping effect.

BRIEF DESCRIPTION OF THE DRAWINGS

The present invention is described in greater detail below on the basis of the attached drawings.

DETAILED DESCRIPTION OF THE DRAWINGS

Figure 1:
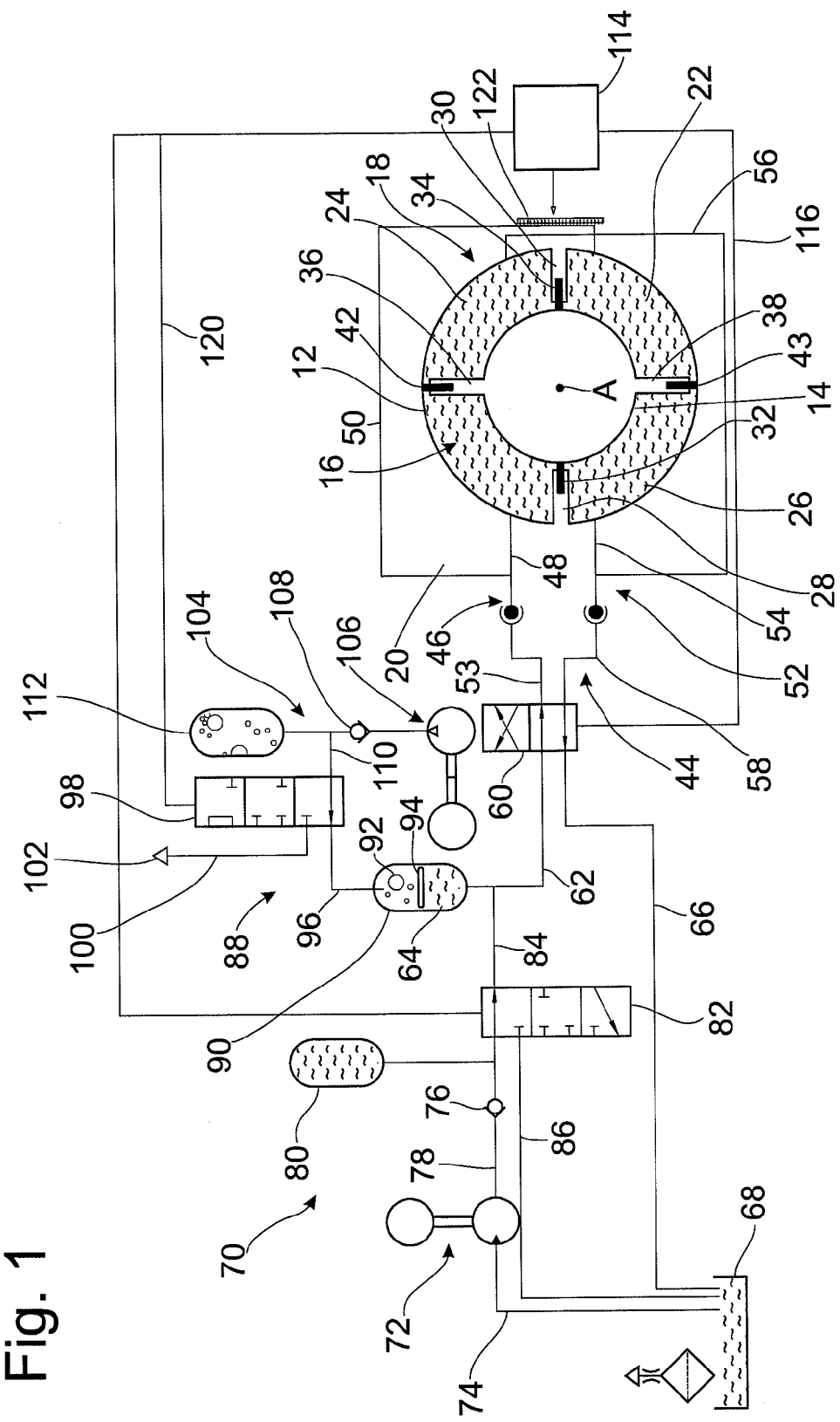
FIG. 1 is a diagrammatic illustration of a torsional vibration damper arrangement according to a first embodiment.

FIG. 1 is a torsional vibration damper arrangement, designated overall by the number 10 according to one embodiment of the invention. This torsional vibration damper arrangement 10 comprises, as its central functional assemblies, a primary side 12, which is to be connected nonrotatably to, for example, the crankshaft of an internal combustion engine, and a secondary side 14. This is connected for rotation in common to the primary side 12 by a damper fluid arrangement 16, to be explained further below, the rotation taking place around an axis of rotation A, which is perpendicular to the plane of the drawing of FIG. 1, but the secondary side is also able to rotate relative to the primary side 12 upon the occurrence of torques or torque fluctuations.

The primary side 12 and the secondary side 14 together form the boundaries of a working volume 18 for a first damper fluid, which is essentially incompressible. This first damper fluid can be a liquid such as an oil or the like. In the example shown here, this working volume 18 comprises two first working spaces 20, 22 and two second working spaces 24, 26. These first and second working spaces 20, 22, 24, 26 are bounded in the circumferential direction by the boundary walls 28, 30 on the primary side 12, which are closed off from the secondary side in a fluid-tight manner by seals 32, 34, and by the two boundary walls 36, 38 on the secondary side 14, which are sealed off against the primary side 12 in a fluid-tight manner by the associated seals 42, 43.

A rotary leadthrough 44 connects a line section 46—formed in, for example, the secondary side 14 and comprising the lines 48, 50 leading to the working space 20 and to the working space 22—to a line 53, which is outside the primary side 12 and outside the secondary side 14 and which therefore does not rotate along with them. In a corresponding manner, the rotary leadthrough 44 connects a line section 52—with lines 54, 56 for the second working spaces 24, 26—to a line 58, which again lies outside the primary side 12 and the secondary side 14.

A valve arrangement 60 is assigned to the two lines 53, 58, and can preferably be brought into two different valve positions. A first valve position, as shown in FIG. 1, establishes a connection of the line 53, which leads to the first working spaces 20, 22, to a line 62, which leads to a compensating space 64 for the first damper fluid, to be described in greater detail below. In this first valve position, a line 66 is connected to the line 58 leading to the second working spaces 24, 26. This line 66 leads to an essentially pressureless reservoir 68 for the first damper fluid. In a second valve position of the valve arrangement 60, the assignment of the lines 53, 58 to the lines 62, 66 is reversed. That is, the line 53 leading to the first working spaces 20, 22 is connected to the line 66, and thus to the reservoir 68, whereas the line 58 leading to the second working spaces 24, 26 is connected to the line 62 and thus to the compensating space 64.

A supply/discharge arrangement 70 for the first damper fluid comprises a pump 72, which takes first damper fluid from the reservoir 68 via a line 74 and conveys it to a line 78, provided with a check valve 76. Following the check valve 76 in the flow direction, the line 78 is connected to a pressure reservoir 80 for the first damper fluid. By means of a valve arrangement 82, which can be brought into three different positions, various operating states of the supply/discharge arrangement 70 can be set. In a first of these operating positions, shown in FIG. 1, the line 78 is connected to a line 84 leading to the line 62. In a second valve position of the valve arrangement 82, the line 78 is shut off, as is a line 86, leading from the reservoir 68 to the valve arrangement 82. In a third valve position of the valve arrangement 82, the line 78 is still shut off, whereas the line 84 and thus the line 62 are connected to the line 86 and thus to the essentially pressureless reservoir 68 for the first damper fluid.

The torsional vibration damper arrangement 10 also comprises a volume 88 for a second damper fluid. In comparison to the first damper fluid, this second damper fluid is highly compressible, and can be, for example, a gas such as air. In a pressure-equalization cylinder arrangement 90, a working space 92 is provided for the second damper fluid. This working space 92 is separated from the compensating space 64 by a variable separating arrangement 94. This variable separating arrangement 94 can comprise, for example, a separating piston, which can shift its position in correspondence with the pressure difference between the two spaces 64 and 92, or it can be a correspondingly deformable separating membrane. A line 96, which leads to a valve arrangement 98 capable of assuming three different valve positions, opens out into the working space 92. From this valve arrangement 98 there also leads a line 100, which leads to a discharge opening 102 open to the outside environment.

A supply device 104, which comprises a compressor 106, is also provided for the second damper fluid. By way of a line 110, equipped with a check valve 108, the compressor conveys the second damper fluid under pressure to the valve arrangement 98 and to a pressure reservoir 112 for the second damper fluid.

It can be seen in FIG. 1 that, when the valve arrangement 98 is in the first valve position shown in FIG. 1, the line 110 from the supply device 104 is connected to the line 96 and thus to the working space 92 for the second damper fluid. The line 100 leading to the discharge opening 102 is closed. In this first valve position, therefore, the supply device 104 can convey second damper fluid into the volume 88 and thus increase the quantity of second damper fluid present therein. In a second valve position, the lines 110, 100, and 96 are closed, which has the result that the quantity of the second damper fluid present in the volume 88 is invariable. In a third valve position, the line 110 is shut off, whereas the lines 96 and 100 are connected to each other and thus the working space 92 is connected to the discharge opening 102 and preferably to the outside environment. Because the pressure of the second damper fluid in the working space 92 will usually be higher than ambient pressure, second damper fluid will be discharged from the volume 88 and thus its quantity in volume 88 will be reduced in this third valve position.

So that the three illustrated valve arrangements 60, 82, and 98 can be moved into their various possible valve positions and/or switched from one position to another, a control device 114 is provided. This is connected by appropriate connecting lines 116, 118, 120 to these valve arrangements. Of course, the control device 114 can also activate the pump 72 and/or the compressor 106 so that it is possible to influence the pressure relationships associated with the supply of first damper fluid or second damper fluid or to provide the corresponding damper fluid under increased pressure in the associated pressure reservoir 80, 112. Preferably, pressure sensors are provided, which indicate when the pump 72 or the compressor 106 is to be operated in order to ensure sufficiently pressurized first damper fluid or second damper fluid.

A load direction sensor 122 is also provided. This yields information which indicates the direction in which torque is to be transmitted between the primary side 12 and the secondary side 14. A first load direction can correspond, for example, to a normal "pull" state, in which, for example, the primary side 12 accepts torque from a drive unit and transmits it via the first damper fluid to the secondary side 14. In a second load state, such as a "push" state, corresponding to an engine braking state, the secondary side 14 transmits torque via the first damper fluid to the primary side 12. The load direction-detecting sensor 122 can, for example, yield information which indicates the relative rotational direction of the primary side 12 relative to the secondary side 14, starting from a no-load neutral position. This information can also be combined, if necessary, with information on the pressures prevailing in the various working spaces 20, 22; 24, 26. Under consideration of this information, the control device 114 controls in particular the various valve arrangements 60, 82, 98 to set the desired damping characteristic. This will also be described below with reference to FIG. 2.

Figure 2:
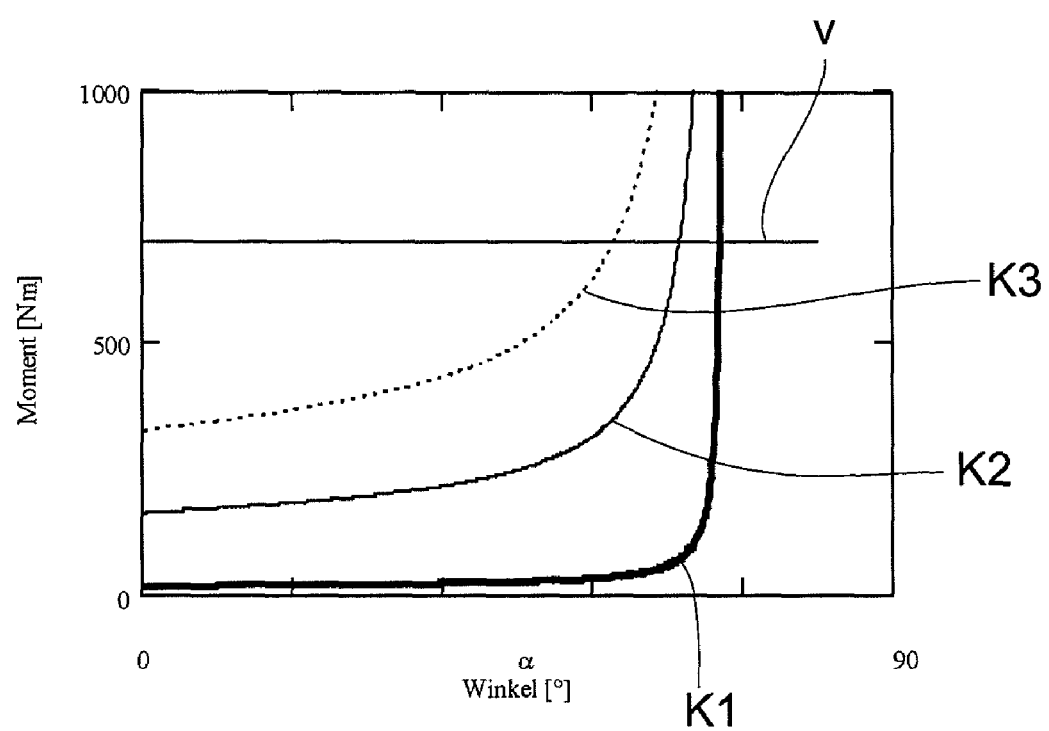
FIG. 2 is a diagram showing various characteristic curves of the torsional vibration damper arrangement of FIG. 1.

As previously explained, it is ensured, in the state illustrated in FIG. 1, that the two first working spaces 20, 22 are connected to the compensating space 64 via the valve arrangement 60. That is, the pressure of the second damper fluid present in the working space 92 delivers the counterforce or counterpressure to the pressure of the first damper fluid present in the first working spaces 20, 22. When the valve arrangement 98 is in its middle valve position, the volume 88 of the second damper fluid is closed off. In this state, torque is being transmitted between the primary side 12 and the secondary side 14 via the first damper fluid present in the first working spaces 20, 22, the characteristic K1, shown in thick solid line in FIG. 2, is in effect. The compressibility of the second damper fluid in volume 88, especially in working space 92, makes possible initially a comparatively pronounced degree of relative rotation between the primary side 12 and the secondary side 14, starting from a relative angle of rotation of zero (0), without any essential increase in torque.

When a certain limit angle is reached, this characteristic K1 shows a relatively sharp inflection, which leads to a comparatively strong or stiff coupling between the primary side 12 and the secondary side 14. It should also be mentioned that, in this state, which, therefore, corresponds to a "pull" state, the two second working spaces 24, 26 are held essentially pressureless by the connection to the reservoir 68 and contribute to the damping effect only to the extent that, in cases where, for example, the volume undergoes oscillating changes as a result of torque fluctuations, corresponding volume flows in the various line sections or lines obviously lead to throttling effects and thus to the dissipation of energy.

If, proceeding from the state described just above, the valve arrangement 98 is brought into the position shown in FIG. 1, for example, in which the working space 92 is connected to the supply device 104, the pressure and also the quantity of the second damper fluid in the volume 88 and especially also in the working space 92 are increased. Depending on the increase in the quantity of the second fluid, this can mean a shift to characteristic K2 or, if the quantity is increased even more, to characteristic K3 in FIG. 2. It can be seen that an increase in the quantity of the second damper fluid leads to the result that the inflection, still comparatively conspicuous in characteristic K1 undergoes a gradual transition, characterized by a correspondingly gradual increase in torque with increasing relative angle of rotation. This means that, by increasing the quantity of the second damper fluid, which would be done especially when very strong torques are present, the hardness or stiffness of the damping can be reduced, where this stiffness can be defined by the gradient of the associated characteristic at a certain comparison torque. In FIG. 2, this comparison torque is assumed to have a value of 700 Nm, for example, and is characterized by the line V. It is easy to see that the gradient and thus the stiffness of the associated damping system decreases as the quantity of second damper fluid increases. This influence exerted on the quantity of second damper fluid, achievable by the bringing of the valve arrangement 98 into its various possible valve positions, therefore makes it possible, especially also in cases where very strong torques are to be transmitted, to arrive at a comparatively pronounced degree of decoupling between the primary side and the secondary side and/or to set the desired stiffness as a function of the amount of torque to be transmitted.

It is possible to shift the working point along one of the associated characteristic curves by switching the valve arrangement 82. An increase in the pressure in the line 62 has the same effect as an increase in the torque and results in an increase in the compression of the first damper fluid in the first working spaces 20, 22. In this way as well, therefore, it is possible to exert an additional influence on the damping behavior by either keeping the pressure in the line section 62 the same, increasing this pressure, or lowering it.

By switching the valve arrangement 60 between its two valve positions, it is possible, of course, to take advantage of this type of damping behavior when the drive system is in "pull" mode, that is, when torque is to be transmitted from the primary side 12 to the secondary side 14 and thus the first damper fluid contained in the first working spaces 20, 22 is compressed. But that is not the only possibility. When, namely, the valve arrangement 60 is brought into the valve position not shown in FIG. 1, in which the line 53 is connected to the line 66 and thus to the reservoir 68, whereas the line 58 and with it the second working spaces 24, 26 are connected to the line 62 and thus to the compensating space 64, it is possible, under compression of the first damper fluid present in the second working spaces 24, 26, to transmit torque from the secondary side 14 to the primary side 12 and thus, for example, to take advantage of the braking torque of an internal combustion engine operating under no-load conditions to brake the vehicle. In this state as well, it is possible, by adjusting the valves 98 and 82, to exert the same influence on the damping characteristic as described previously, where, of course, it is also possible to differentiate between push mode and pull mode on the basis of the change in the quantity of the second damper fluid in the working space 92.

From the preceding description it can be seen that, with the inventive design of a torsional vibration damper arrangement 10, a large range of variability in the operating characteristic can be achieved without having to make an excessive amount of space available in the area of the rotating system areas, i.e., in the area of the primary side 12 and in the area of the secondary side 14. Because torque is transmitted only via the first damper fluid, the entire system area containing the second damper fluid can be located completely outside these rotating assemblies. This reduces not only the amount of space required for the primary side 12 or secondary side 14 but also simultaneously avoids the leakage problems of a rotary leadthrough for a gaseous second damper fluid. It is not necessary, furthermore, to define various fluid volumes at the early design stage and thus to define the damping characteristic accordingly. As a result of the removal of the volume 88 of the second damper fluid and of all the system areas assigned to it, especially the valve arrangement 98 and the supply device 104, out of the rotating system area, it is possible to locate these assemblies in any desired position in a vehicle. They do not have to be arranged inside a bell housing any longer but can instead be connected to each other by appropriate line connections.

Another advantage of the system described above is that, through the provision of the pressure reservoirs 80, 112, it is possible to increase the pressure or the quantity without having to start up the pumps or compressors in question immediately or to have them operate continuously.

The setting of the various valve positions to influence the damping characteristic can, of course, also be done under consideration of additional parameters such as the torque introduced into a drive train by a drive unit, so that it is possible not only to detect the direction in which the torque is flowing, and if necessary, to differentiate between the push state and the pull state, but also and in particular to recognize quickly in the pull state the occurrence of torque variations and thus to adapt the damping characteristic to the magnitude of the expected torque to be transmitted via the torsional vibration damper arrangement 10.

Figure 3:
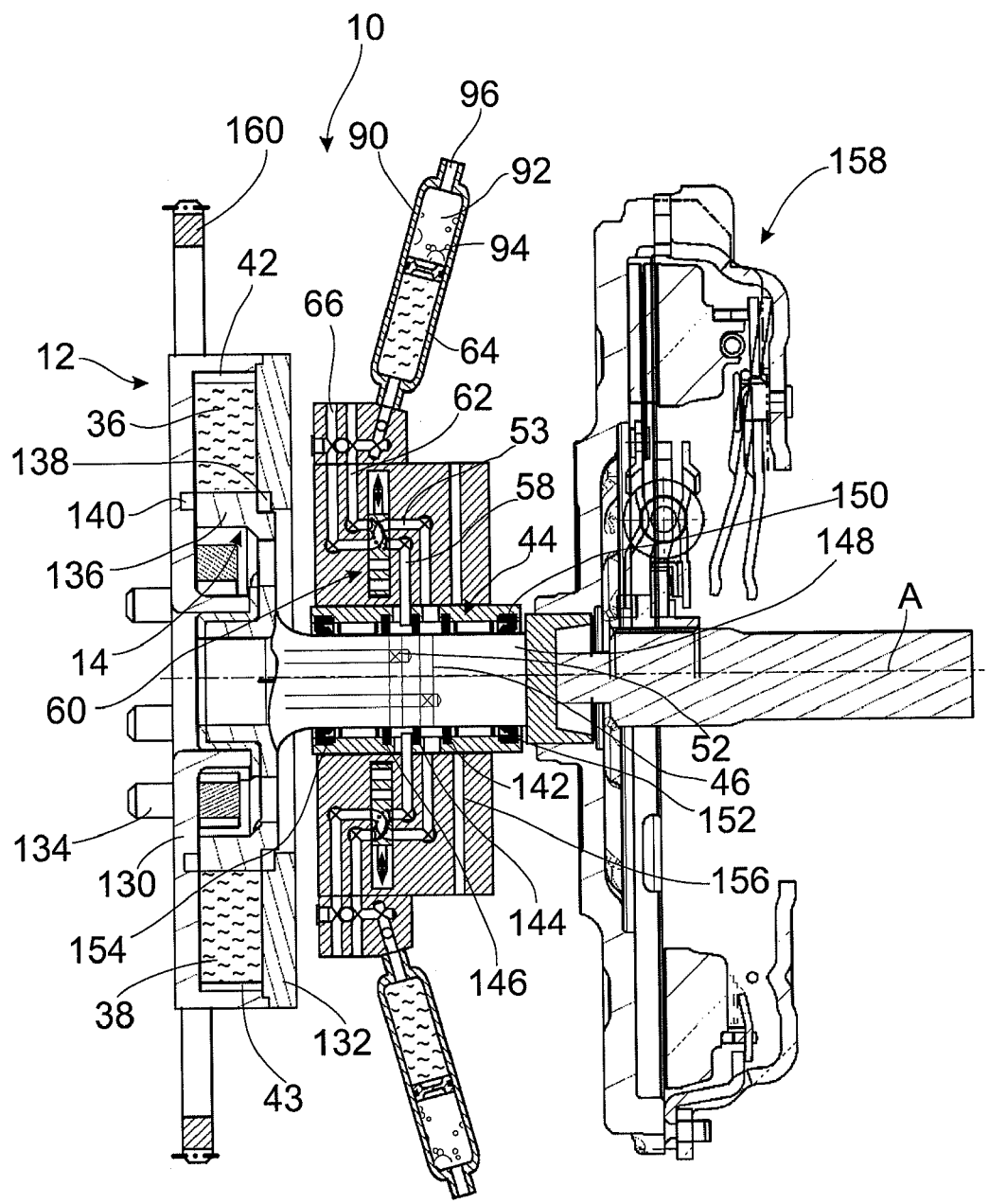
FIG. 3 is a longitudinal cross section through an essential part of the torsional vibration damper arrangement illustrated in FIG. 1.

FIG. 3 shows a longitudinal cross section of one embodiment of the system areas of the torsional vibration damper arrangement 10, that is, a cross section containing the axis of rotation A. The primary side 12, which is designed here with two disk parts 130, 132. The radially inside area of the disk part 130 is attached nonrotatably to a drive shaft, such as the crankshaft of an internal combustion engine, by means of bolts 134. The disk part 132 and the disk part 130 together form the radially outer boundaries and the axial boundaries of the first and second working spaces 20, 22, 24, 26 (FIG. 1) for the first working fluid. The secondary side 14, with a ring-shaped radially inner area 136, carries the two boundary walls 36, 38, which extend away from the radial inner area at an angular distance of 180° from each other and to which the seals 42, 43 are attached. The working spaces 20, 22, 24, and 26 are sealed off in the axial direction in a fluid-tight manner by two sealing rings 138, 140 between the ring-shaped area 136 and the two disk parts 130, 132.

The line sections 46 and 52, which lead from the rotary leadthrough 44 inside the secondary side 14 to the first working spaces 20, 22 and to the second working spaces 24, 26 of the first damper fluid. The rotary leadthrough 44, as can also be seen FIG. 3, is preferably configured with several sealing elements 142, 144, 146, which separate the various line sections from each other and which act between an axle-like projection 148 of the secondary side 14 and a nonrotating sleeve component 150. Leakage safety seals 152, 154, located farther away in the axial direction, form the boundaries of the pressure spaces on both sides of the seals 142, 144, 146; these pressure spaces are connected to the reservoir 68 by a leakage line 156. Thus it is possible to avoid any leakage of the first damper fluid from the area of the rotary pass through 44.

The previously mentioned axle-like projection 148 of the secondary side 14 is preferably connected to the input area of the friction clutch 158, which follows after the torsional vibration damper arrangement 10 in the direction of torque flow.

In FIG. 3 the area containing the various nonrotating lines, i.e., the area in which the valve arrangement 60 is located, is preferably designed in such a way that it completely surrounds the rotary leadthrough 44, especially also the sleeve-like component 150 of that leadthrough. Of course, it would also be possible to provide a shoulder on a certain circumferential area of this nonrotating, sleeve-like component 150 and to accommodate the corresponding lines in this shoulder area. As indicated in FIG. 3, a pressure-equalization cylinder arrangement 90 is provided at several points on the circumference. In one embodiment, this arrangement is designed in, a ring-like encircling manner, or present at only one point on the circumference. The lines 62, 66, and 96, which are open in FIG. 3, connect to the lines and valve arrangements illustrated in FIG. 1.

It should also be mentioned that the primary side 12 preferably carries a starter gear ring 160, by means of which an internal combustion engine can be started without the presence of any intermediate elastic components.

Figure 4:
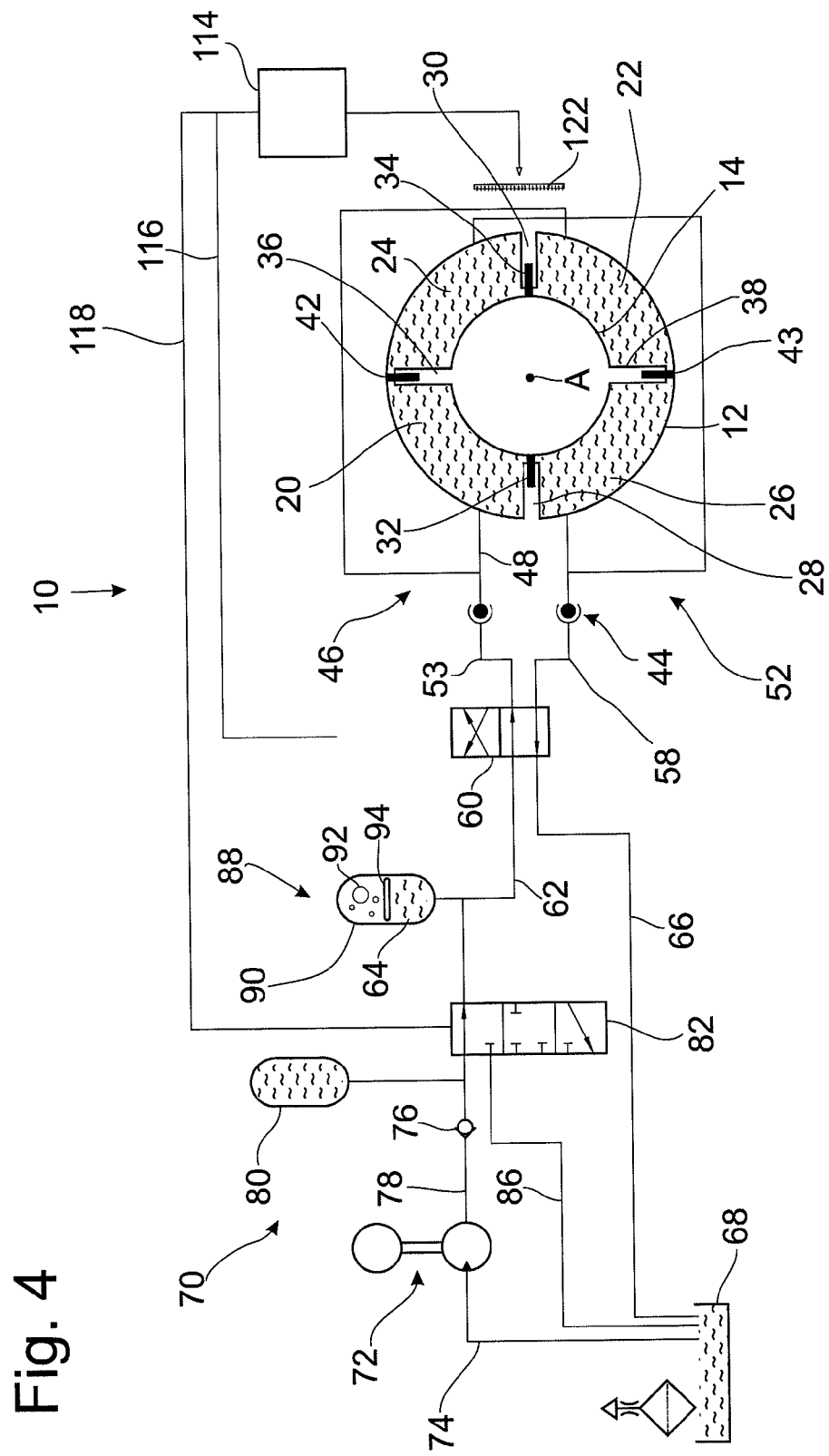
FIG. 4 is a diagrammatic illustration of an alternative design of a torsional vibration damper.

One embodiment of an inventively designed torsional vibration damper arrangement 10 is shown in FIG. 4. Assemblies which are the same as those discussed above are designated by the same reference numbers. In the following, only the differences with respect to the embodiment of FIG. 1 will be discussed.

In the embodiment shown in FIG. 4 that the volume 88 of the second damper fluid comprises essentially only the working space 92 in the pressure-equalization cylinder arrangement 90. The volume of this working space 92 is changed by the displacement of the variable separating arrangement 94. In this embodiment, the quantity of second damper fluid contained in the volume 88 cannot be changed. This means that, by specifying this quantity of second damper fluid, a characteristic with a predetermined stiffness, i.e., a predetermined gradient, especially in the area of higher torques, is selected. This characteristic can not be changed. Only the working point on the characteristic curve can be influenced by changing the pressure of the first damper fluid. As a result, it becomes possible in particular—in cases where, for example, comparatively high torques are to be transmitted—to set the primary side 12 back with respect to the secondary side 14 into a range of relative angle of rotations which corresponds to the no-load state shown in FIG. 4 and obviously also in FIG. 1, so that, even in this phase, comparatively wide torque fluctuations, which lead to correspondingly strong deflections of the primary side 12 relative to the secondary side 14, can be suitably absorbed.

In the embodiment shown in FIG. 4, the quantity of the second damper fluid cannot be changed, it is possible, for example—because there is no basic restriction on the amount of space which can be made available for the volume 88—to select a characteristic curve corresponding to K3 in FIG. 2 by adjusting the volume 88 to an appropriate value. This combines the advantage of a comparatively less stiff characteristic of the damper system with a much simplified structural design, because it is now possible to eliminate completely the valve arrangement 98 and the supply device 104 shown in FIG. 1.

Figure 5:
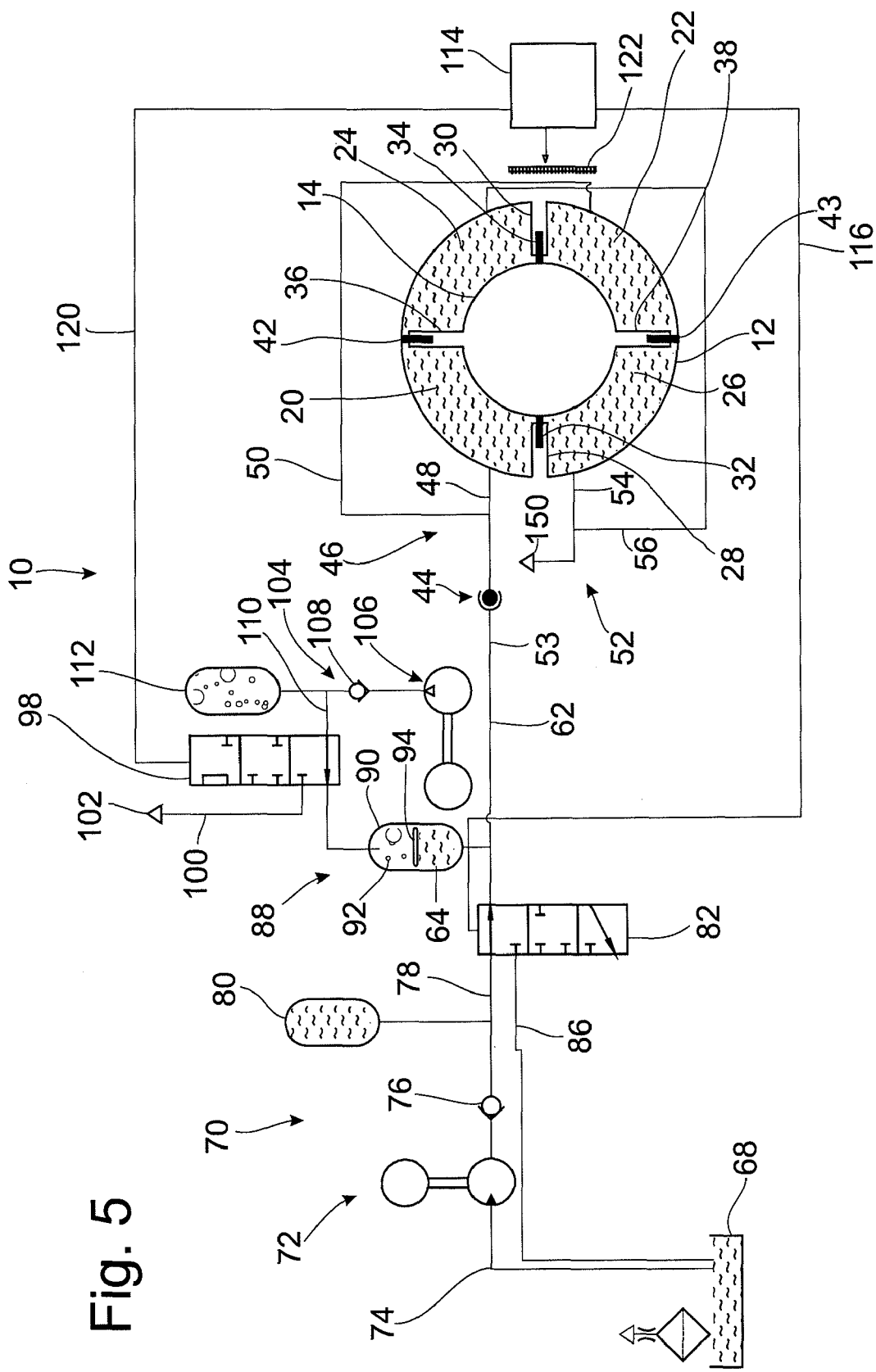
FIG. 5 is a diagrammatic illustration of an alternative design of a torsional vibration damper arrangement.

Another embodiment is shown in FIG. 5. Here, too, parts which are the same are designated by the same reference numbers as those used above.

In the embodiment shown in FIG. 5, we can see that the valve arrangement 60 of the embodiments of FIGS. 1 and 4 is no longer present. This means that the rotary leadthrough 44 is responsible for establishing a connection between the line section 46 and the line 53, between the pressure-equalization cylinder arrangement 90 and the lines 48 and 50 leading to the first working spaces 20 and 22. This makes a much simpler and more compact design of the rotary leadthrough 44. The second working spaces 24, 26 serve in this variant only as compensating volumes, so that, upon relative rotation between the primary side 12 and the secondary side 14, a corresponding decrease or increase in the volumes of the first working spaces 20, 22 can be achieved. This means that the line section 52 with the lines 54 and 56, like the second working spaces 24 and 26, does not contain any first damper fluid. Instead, it contains, for example, air and is open to the environment through a compensating opening 150. In this embodiment, the damping effect, which is produced primarily by the compressibility of the second damper fluid in the working space 92, is obtained only when the first working spaces 20, 22 are being put under pressure, which is the case when, for example, the drive system is operating in pull mode. The damping characteristic can be varied by, for example, adjusting the valve arrangement 82 to change the pressure of the first damper fluid.

It should be noted that an embodiment is also obviously possible in which, as can be seen in FIG. 1, no valve arrangement 60 is present and thus the rotary leadthrough 44 leads only to the first working spaces 20, 22, and in which, furthermore, as can be seen in FIG. 4, the pressure-equalization cylinder arrangement 90, i.e., the working space 92, is not connected to a valve arrangement 98.

It should be noted that the structural design shown in FIG. 3 can be used in any of the design variants shown in FIGS. 1, 4, and 5. In the case of the variant shown in FIG. 4, it would be necessary only to seal off tightly the working space 92, i.e., the line 96 leading away from this space. In the case of the variant shown in FIG. 5, the part located outside the rotary leadthrough 44 would contain only the line 53 and, permanently connected thereto, the line 62, but it would no longer contain the line 58 or the line 66.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A torsional vibration damper arrangement for the drive train of a motor vehicle, the torsional vibration damper comprising:
   a primary side;
   a secondary side coupled to the primary side for rotation about an axis of rotation;
   a damper fluid arrangement coupling the primary side and the secondary side for relative rotation of the primary side and the secondary side with respect to each other, the damper fluid arrangement configured to transmit torque between the primary side and the secondary side, the damper fluid arrangement comprising:
      a first damper fluid of a first compressibility; and
      a second damper fluid of a second compressibility greater than the first compressibility, the second damper fluid being put under load when the pressure of the first fluid increases; and
   a volume containing the second damper fluid located outside the primary side and outside the secondary side, the volume being configured so that the volume does not rotate with the primary side and the secondary side around the axis of rotation.

2. The torsional vibration damper arrangement according to claim 1, further comprising:
   a working volume of the first damper fluid formed in the area of the primary side and of the secondary side;
   a compensating space for the first damper fluid, a volume of the compensating space can be changed by at least one of compression and decompression of the second damper fluid; and
   a rotary leadthrough provided for the first damper fluid configured to couple the working volume of the first damper fluid with the compensating space for the first damper fluid.

3. The torsional vibration damper arrangement according to claim 2, further comprising a pressure-equalization cylinder arrangement configured to provide the compensating space for the first damper fluid and a working space for the second damper fluid, wherein the compensating space and the working space are separated from each other in an essentially fluid-tight manner by a variable separating arrangement.

4. The torsional vibration damper arrangement according to claim 3, wherein the variable separating arrangement comprises at least one of a separating piston and a separating membrane.

5. The torsional vibration damper arrangement according to claim 2, wherein the working volume of the first damper fluid comprising at least one first working space for the first damper fluid bounded by the primary side and the secondary side, where the volume of the at least one first working space decreases upon relative rotation of the primary side with respect to the secondary side in a first direction of relative rotation and increases upon relative rotation in a second direction of relative rotation.

6. The torsional vibration damper arrangement according to claim 5, wherein the working volume of the first damper fluid comprises a second working space assigned to each first working space, the volume of which second working space increases upon relative rotation in the first direction of relative rotation and decreases upon relative rotation in the second direction of relative rotation.

7. The torsional vibration damper arrangement according to claim 6, wherein the at least one first working space is connected to the compensating space by the rotary leadthrough.

8. The torsional vibration damper arrangement according to claim 7, wherein the second working space assigned to the at least one first working space further comprises a pressure-relief opening arrangement.

9. The torsional vibration damper arrangement according to claim 8, wherein the second working space assigned to the at least one first working space is without the first damper fluid.

10. The torsional vibration damper arrangement according to claim 7, further comprising a third valve arrangement the third valve arrangement configured such that:
   in a first valve position, the at least one first working space is coupled to the compensating space and the second working space assigned to the at least one first working space is coupled with the essentially pressureless reservoir for first damper fluid, and,
   in a second valve position, the at least one first working space is coupled with the essentially pressureless reservoir for first damper fluid and the second working space is coupled with the compensating space.

11. The torsional vibration damper arrangement according to claim 10, further comprising a load direction-detecting arrangement configured to detect the load direction of at least one of the primary side and of the secondary side wherein the third valve arrangement is brought into its first valve position or into its second valve position based at least in part on the load direction.

12. The torsional vibration damper arrangement according to claim 11, wherein when the load direction-detecting device detects a load rotation in a first load direction, the third valve arrangement is in its first valve position or is brought into the first valve position, and,
   when the load is detected in a second load direction, the third valve arrangement is in its second valve position or is brought into the second valve position,
   wherein, when the load is applied in the first load direction, torque is to be transmitted from the primary side to the secondary side and, when load is being applied in the second load direction, torque is to be transmitted from the secondary side to the primary side.

13. The torsional vibration damper arrangement according to claim 1, wherein the quantity of second damper fluid contained in the volume containing the second damper fluid is variable.

14. A torsional vibration damper arrangement according to claim 13, further comprising a supply device configured to increase the quantity of the second damper fluid assigned to the volume containing the second damper fluid.

15. The torsional vibration damper arrangement according to claim 14, wherein the supply device comprises a compressor and a pressure reservoir coupled to the compressor.

16. The torsional vibration damper arrangement according to claim 13, wherein a discharge device configured to reduce the quantity of the second damper fluid is assigned to the volume containing the second damper fluid.

17. The torsional vibration damper arrangement according to claim 16, wherein the discharge device comprises a first valve arrangement.

18. The torsional vibration damper arrangement according to claim 17, wherein the first valve arrangement is configured to:
    close off the volume of the second damper fluid,
    couple a supply device for second damper fluid with the volume of the second damper fluid, or
    couple the volume of the second damper fluid with a discharge opening.

19. The torsional vibration damper arrangement according to claim 1, further comprising a supply/discharge arrangement for the first damper fluid configured to change a pressure of the first damper fluid.

20. The torsional vibration damper arrangement according to claim 19, wherein the supply/discharge arrangement comprises a second valve arrangement, the second valve arrangement configured to:
    close off, by way of the rotary leadthrough, the working volume of the first damper fluid,
    couple the working volume of the first damper fluid with a supply device for the first damper fluid, or
    couple the working volume of the first damper fluid with a substantially pressureless reservoir for the first damper fluid.

21. The torsional vibration damper arrangement according to claim 20, wherein the supply device for the first fluid comprises a pump further comprises a pressure reservoir.

22. The torsional vibration damper arrangement according to claim 1, wherein the first damper fluid is a liquid and the second damper fluid is a gas.

* * * * *